United States Patent Office 2,925,437
Patented Feb. 16, 1960

2,925,437

METHOD FOR CONVERTING UNSATURATED ORGANIC COMPOUNDS TO ORGANOBORON COMPOUNDS

Herbert C. Brown, West Lafayette, Ind.

No Drawing. Application October 30, 1956
Serial No. 619,355

25 Claims. (Cl. 260—606.5)

This invention relates to the preparation of organoboron compounds and more particularly to the preparation of organoboron compounds having the formula $R_3B$ in which R is a saturated hydrocarbon radical such as an alkyl radical. This application is a continuation-in-part of my copending application Serial No. 521,873, filed July 13, 1955, now Patent No. 2,856,428.

Meerwein, Hinz, Majert and Sonke (J. Prakt. Chem., 147, 240 (1936)) have described the synthesis of trialkylborons. Thus, triethylboron has been prepared by the reaction of ethylmagnesium bromide on boron trifluoride in diethyl ether as solvent. The reaction is illustrated by the equations:

$$C_2H_5Br + Mg \rightarrow C_2H_5MgBr$$

$$3C_2H_5MgBr + BF_3 \rightarrow (C_2H_5)_3B + 3MgFBr$$

This procedure has disadvantages since it requires a number of intermediates, such as ethyl bromide, magnesium and boron trifluoride, and involves the formation of a by-product, such as MgBrF, which must be recovered for the economic production of trialkylborons.

Hurd (Journ. Am. Chem. Soc., 70, 2053 (1948)) has reported that gaseous diborane may be reacted with a large excess of olefinic hydrocarbons in sealed tubes at 100° C. for extended periods of time. Thus, a mixture of triisobutylboron and tri-t-butylboron was obtained by the reaction of isobutylene and diborane in a sealed tube at 100° C. for 24 hours. Reaction of ethylene with diborane at 100° C. for 96 hours produced triethylboron.

R. S. Brokaw and R. N. Pease (Journ. Am. Chem. Soc., 72, 3237 (1950); ibid., 72, 5263 (1950)) have reported that gaseous olefins, such as ethylene, propylene and 1-butene, react with aluminum borohydride at elevated temperatures to form trialkylborons along with mixed alkylaluminum hydrides. Thus, the reaction of ethylene with aluminum borohydride at 140° C. is postulated to be

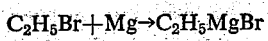
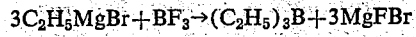

The last two of the above mentioned methods offer some advantages over the Grignard route in that they utilize olefins instead of the more expensive alkyl halides. However, neither diborane nor aluminum borohydride are commercially available materials at the present time. Moreover, the characteristics of these materials are such that they are difficult to handle. Thus, diborane is a gas, rapidly hydrolyzed by moisture, and very sensitive to air oxidation. Aluminum borohydride is also sensitive to water and reacts with explosive violence with air.

There would be obvious advantages to the utilization of the alkali metal borohydrides for the synthesis of organoborons. The alkali metal borohydrides are now commercially available and exhibit remarkable stability to air and water. However, it is well known that olefins do not react with the alkali metal borohydrides. Thus, sodium borohydride is widely used for the selective reduction of the carbonyl groups in unsaturated aldehydes and ketones. No reaction has been observed in heating olefins with the alkali metal borohydrides at temperatures as high as 200° C.

The present invention is based upon the discovery that the addition of relatively minor amounts of aluminum chloride to solutions of sodium borohydride in the dimethylether of diethyleneglycol or the dimethylether of triethyleneglycol provides a reagent which reacts with hydrocarbons having an olefinic double bond, such as ethylene, propylene, 1-butene, 2-butene, 1-pentene, 2-pentene, 1-hexene, 1-tetradecene, diisobutylene, cyclopentene, cyclohexene, styrene, α-methylstyrene, etc., to form organoboron derivatives. The reaction times are short at room temperatures but even shorter at temperatures of the order of 75° to 100° C. Yields of organoborons of from 70 to 90 percent are easily realized. Other solvents may be utilized, such as dioxane, tetrahydrofuran, diethyl ether, tetrahydropyran and other ethers of mono- and polyethylene glycols, in place of the dimethylether of diethyleneglycol and the dimethylether of triethyleneglycol. Also, other Friedel-Crafts catalysts may be used, such as gallium trichloride, and titanium tetrachloride, although the aluminum halides, such as aluminum chloride and aluminum bromide, appear to be the most useful of the catalysts for reasons of both economy and effectiveness.

More broadly, the reagent used in the practice of the invention may be defined as comprising essentially an alkali metal borohydride and a halide of a polyvalent metal having a valence greater than two and less than six in a liquid carrier providing the metal is not rapidly reduced to a lower valence by the reagent. For the most rapid and complete reaction, the reagent should contain equivalent amounts of the borohydride and metal halide. Thus, when sodium borohydride and aluminum chloride are used it is preferred that they be present in the reagent in the proportion of three moles of the borohydride to one mole of the halide.

The term "alkali metal borohydride" as used herein is intended to mean the simple alkali metal borohydrides, such as sodium borohydride, potassium borohydride and lithium borohydride. The term "halide of a polyvalent metal" is used herein to mean the chloride, iodide or bromide of true metals and does not include either metalloids, such as boron or silicon, or non-metals, such as phosphorus or sulphur.

The term "unsaturated" as used herein is intended to refer to organic compounds which owe their unsaturation to the presence of an olefinic double bond or an acetylenic triple bond, although such compounds may also contain an aromatic ring. Conversely, the term "saturated" as used herein is not intended to exclude compounds containing an aromatic ring having a substituted aliphatic radical. Aromatic rings do not add bromine at room temperature whereas the other derivatives react readily.

In its broad aspect the method of the invention is applicable for the preparation of organoboron compounds by reacting a reagent consisting of an alkali metal borohydride and a halide of a polyvalent metal having a valence greater than two and less than six in a liquid carrier with an unsaturated organic compound. As illustrative of such unsaturated compounds I may mention acetylenes such as 3-hexyne, olefins such as ethylene, dienes such as butadiene, unsaturated acids and ketones and unsaturated derivatives such as p-nitrostyrene, allylethyl ether and allyldimethylamine.

More especially, the invention contemplates the conversion of olefins, such as 1-olefins, 2-olefins and cycloolefins sometimes referred to as cycloalkenes or cycloalkylenes, to organoboron compounds having the formula $R_3B$ in which R represents a saturated hydrocarbon radical as illustrated by the following equations:

$$9C_2H_4 + 3NaBH_4 + AlCl_3 \rightarrow 3(C_2H_5)_3B + AlH_3 + 3NaCl$$

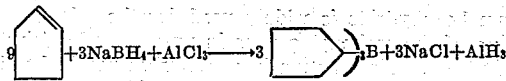

$9(CH_3)_3CCH_2C(CH_3)=CH_2 + 3NaBH_4 + AlCl_3$
$\rightarrow 3[(CH_3)_3CCH_2C(CH_3)HCH_2]_3B + 3NaCl + AlH_3$ $9CH_3CH:CHCH_3 + 3NaBH_4 + AlCl_3$
$\rightarrow 3(CH_3CHCH_2CH_3)_3B + AlH_3 + 3NaCl$ $9C_6H_5C(CH_3)=CH_2 + 3NaBH_4 + AlCl_3$
$\rightarrow 3[C_6H_5CH(CH_3)CH_2]_3B + 3NaCl + AlH_3$ Typical results of the synthesis of trialkylborons are summarized in the following table where 0.2 mole olefin, 0.1 mole sodium borohydride and 0.033 mole aluminum chloride in the dimethylether of diethylene glycol as solvent were used:

| Olefin | Reaction Product | Yield, percent | | B.P., ° C. |
|---|---|---|---|---|
| | | Crude | Purified | |
| 1-Octene | Tri-n-octylboron | 93.2 | 82.5 | 144-5°/2 mm. |
| 1-Hexene | Tri-n-hexylboron | 97.0 | 87.0 | 124-5°/1 mm. |
| Cyclohexene | Tricyclohexylboron | | 74.0 | 131-2°/2 mm. |
| Cyclopentene | Tricyclopentylboron | 87.0 | 79.0 | 118-119°/2 mm. |
| 1-Pentene | Tri-n-pentylboron | | 88.0 | 94-95°/2 mm. |
| 2-Pentene | Tri-2 and 3-pentylboron | | 86.0 | 81-82°/2 mm. |

While in the practice of the present invention it is presently preferred to employ the dimethylether of diethyleneglycol or the dimethylether of triethyleneglycol as the liquid carrier, other liquid carriers may be used. Usually, however, when the liquid carrier is not a solvent for the alkali metal borohydride, more satisfactory results are obtained if an amount of a solvent, such as polyethylene glycol dimethylether, sufficient to solubilize the alkali metal borohydride is used in conjunction with the non-solvent liquid carrier. Thus, substantially quantitative yields may be achieved in certain instances with a reagent comprising sodium borohydride, aluminum chloride and a liquid carrier containing 20 percent of the dimethylether of diethyleneglycol and 80 percent of tetrahydrofuran while only about an 85 percent yield is achieved when the liquid carrier is entirely tetrahydrofuran.

During preliminary investigations anhydrous aluminum chloride was sublimed and dissolved in dimethylether of diethylene glycol to form a two molar solution. Sodium borohydride recrystallized from dimethylether of diethyleneglycol was dissolved in the same solvent to form a two molar solution. When equivalent amounts of sodium borohydride and aluminum chloride in this solvent are mixed, a clear colorless solution is obtained. The absence of a precipitate indicates that the simple formation of aluminum borohydride is not produced as indicated by the equation:

$$3NaBH_4 + AlCl_3 \rightarrow Al(BH_4)_3 + 3NaCl$$

The preparation of aluminum borohydride by reacting an alkali metal borohydride with an aluminum halide as indicated by the last equation is described in the patent to H. I. Schlesinger and H. C. Brown No. 2,599,203. That patent indicates that the reaction is effected at temperature of about 50° C. to about 100° C. and that when the alkali metal borohydride used is sodium borohydride a temperature of about 100° C. is desirable. It will be noted that in the practice of the present invention the reagent consisting of sodium borohydride and aluminum chloride in a solvent reacts with olefins at room temperature to form organoboron compounds thus indicating that the effective reactant is not aluminum borohydride. The prior art previously mentioned indicates that a temperature of 140° C. is required for effecting the reaction of ethylene with aluminum borohydride. Also, it is known that aluminum borohydride in the presence of ethers forms ether complexes.

The trialkylborons are readily oxidized by air either in the absence of metal catalysts or, more readily, in the presence of metal catalysts, such as cobalt or manganese naphthenate, or by hydrogen peroxide, to the corresponding boronic or borate esters. These esters are easily hydrolyzed to boric acid and the alcohol. The reaction, therefore, provides a means of converting olefins to alcohols via the organoboron compounds. Thus, 1-octene was converted to trioctylboron and, after oxidation and hydrolysis, an 80 percent yield of 1-octanol was realized. Similarly, 1-pentene gave a 95 percent yield of 1-pentanol. Styrene yielded β-phenylethyl alcohol and α-methylstyrene yielded β-methyl-β-phenylethyl alcohol.

The invention is illustrated further by the following examples.

Preparation of Triethylboron

A two molar solution of sodium borohydride in dimethylether of diethylene glycol was placed in a copper-lined autoclave and an equal volume of a 0.7 molar solution of aluminum chloride in the same solvent was added. Ethylene was added to a pressure of 1000 pounds per square inch. The reaction mixture was heated to 100° C. for six hours. The auto-clave was opened under nitrogen and triethylboron (B.P. 95° C.) was recovered by distillation. The yield was 60 percent.

Preparation of tricyclopentylboron

Into a dry 250 ml. round-bottomed flask was placed 0.1 mole of sodium borohydride (100 ml. of 1.0 molar solution in dimethylether of diethylene glycol) and 0.033 mole aluminum chloride (20 ml. of a 1.66 molar solution in the same solvent). The solutions were mixed by means of a magnetic stirrer and the flask fitted with a condenser and separatory funnel. 0.2 mole of cyclopentene were placed in the separatory funnel, the system flushed out with nitrogen, and the olefin added. The reaction was exothermic and the rate of addition was controlled to maintain the temperature in the desired range. At room temperature a reaction time of 3 hours was used. At 75° C., a reaction time of 0.5 hour was used.

The flask and its contents were cooled and the condenser was replaced with a vacuum distillation unit. The mixture was fractionated under reduced pressure (1-2 mm.) to remove the solvent, followed by the organoboron compound. There was obtained 11.7 grams of tricyclopentylboron (low melting solid), B.P. 118-119° C. at 2 mm., the yield being 80 percent.

The preparation was repeated using 0.033 mole of gallium trichloride. A 65 percent yield of tricyclopentylboron was isolated. Using 0.025 mole of titanium tetrachloride and a reaction time of 6 hours at 100° C., a 60 percent yield of tricyclopentylboron was obtained.

Cyclopentene was heated at 100° C. with sodium borohydride in dimethylether of diethylene glycol (no added metal halide) for 48 hours. No tricyclopentylboron was isolated.

Preparation of tricyclohexylboron

Into a 500 ml. round-bottom flask was placed 0.1 mole of lithium borohydride, 0.033 mole aluminum chloride, 0.2 mole of cyclohexene and 100 ml. of diethyl ether. The reaction mixture was heated under reflux for 6 hours. At the end of this time, water was added and the ether layer was separated, dried and distilled. A 70 percent yield of tricyclohexylboron, B.P. 131-2° C. at 2 mm., was collected. All operations were carried out under a nitrogen atmosphere.

The reaction was repeated using aluminum bromide and aluminum iodide instead of the chloride. In each case yields of 50–60 percent of the tricyclohexylboron were realized.

In place of diethyl ether, tetrahydrofuran was used. A 75 percent yield of tricyclohexylboron was obtained.

*Preparation of tri-n-pentylboron and 1-pentanol*

This reaction was carried out in the same manner as described in the previous example of the preparation tricyclopentylboron except that 1-pentene was used instead of cyclopentene. A yield of 88 percent of tri-n-pentylboron, B.P. 94–95° C. at 2 mm. was obtained.

In a 250 ml. round-bottom flask were placed 15 grams of the tri-n-pentylboron and 30 percent hydrogen peroxide was added in two batches of 20 ml. followed by 5 ml. of sodium hydroxide. A total of 40 ml. of hydrogen peroxide was added. The reaction was highly exothermic and the hydrogen peroxide was added at such a rate as to maintain gentle refluxing of the reaction mixture. At the end of the addition, the contents were heated on a steam cone for a few minutes, then cooled in ice, and extracted with diethyl ether. The ether extracts were washed with water, dried and distilled. 10.8 grams of the alcohol product were obtained, B.P. 136–7° C., and was shown to be 95 percent of 1-pentanol by infrared analysis.

While the invention is particularly directed to the conversion of olefins, such as 1-olefins, 2-olefins and cycloalkylenes to the corresponding boron compounds, its broader application to the conversion of other unsaturated compounds, such as acetylenes, dienes and compounds other than hydrocarbons, to corresponding boron compounds is illustrated by the following examples.

*Conversion of butadiene*

Butadiene (0.1 mole) was dissolved in the dimethylether of diethylene glycol. A solution of sodium borohydride (0.033 mole) and aluminum chloride (0.011 mole) in the same solvent was added to the butadiene solution at 0° C. After several hours at 0° C. the reaction mixture was allowed to warm up to room temperature and allowed to stay overnight in a nitrogen atmosphere. Three volumes of water were added and the organic layer was separated from the water-solvent layer. The oily organic layer weighed 15 grams, indicating a yield of 80 percent. The material reacted rapidly with bromine and with oxygen.

*Conversion of 3-hexyne*

0.1 mole of 3-hexyne was treated in the same manner as in the last preceding example. After hydrolysis there was obtained 20 grams of an oily liquid which contained boron and exhibited unsaturation toward bromine. It was concluded that the product must be an unsaturated borane derivative in which a boron-hydrogen link of the reagent had added across the triple bond forming a substituted trivinyl borane.

*Conversion of p-nitrostyrene*

To a solution of borohydride (0.033 mole) and aluminum chloride (0.011 mole) in 100 ml. of the dimethylether of diethylene glycol was added 0.1 mole of p-nitrostyrene. The reaction mixture was heated at 75° C. for several minutes, cooled, and water added to destroy residual hydride. The organic layer was separated from the water-solvent mixture in essentially quantitative yield. The oily liquid contained both boron and nitro groups.

*Conversion of allyl chloride*

Allyl chloride (0.1 mole) was treated with the reagent in the same manner as in the previous example. After hydrolysis, the product was obtained as an oily liquid which contained both chlorine and boron. The product reacted rapidly with atmospheric oxygen. On attempted distillation, hydrogen chloride was evolved.

*Conversion of ethyl allylether*

Ethyl allylether (0.1 mole) was treated with the reagent in the dimethylether of diethylene glycol. After one hour at 100° C., water was added to destroy residual hydride. The organic layer was taken up in ether, washed with water, dried and distilled. The product was collected at 150° C. at 1 mm. A 60 percent yield was realized.

*Conversion of ethyl oleate*

Ethyl oleate (0.1 mole) was treated with 0.15 mole of sodium borohydride and 0.05 mole of aluminum chloride in the dimethylether of diethylene glycol. After a few minutes at 75° C., the reaction mixture was cooled and water added to destroy residual hydride. The hydrogen evolved indicated the utilization of three hydrides per mole of oleic acid ester. The product, an oily liquid, 95 percent yield, exhibited no unsaturation. It is considered that two boron-hydrogen links must have been utilized to reduce the ester group with the residual link reacting with the double bond to form a boron compound. An attempt was made to distill the product at 0.1 mm. However, even with a bath temperature of 250° C., the product failed to distill.

I claim:

1. The method of preparing an organoboron compound which comprises reacting an unsaturated organic compound with an alkali metal borohydride and a Friedel-Crafts catalyst selected from the group consisting of chlorides, bromides and iodides of a polyvalent metal having a valence from three to five in an inert ethereal liquid, said unsaturated organic compound being selected from the group consisting of olefins, cycloolefins, dienes, alkynes arylalkenes, alkyl alkenoates, haloalkenes, nitroarylalkenes, alkenyl ethers and alkenylamines.

2. The method as claimed by claim 1 wherein the inert ethereal liquid includes an inert solvent for the borohydride in an amount at least sufficient to solubilize the borohydride.

3. The method as claimed by claim 2 wherein the polyvalent metal is aluminum.

4. The method as claimed by claim 3 wherein the alkali metal borohydride is sodium borohydride.

5. The method as claimed by claim 4 wherein the solvent is selected from the group consisting of the dimethylethers of diethylene glycol and triethylene glycol.

6. The method of preparing an organoboron compound which comprises reacting an olefin with an alkali metal borohydride and a Friedel-Crafts catalyst selected from the group consisting of chlorides, bromides and iodides of a polyvalent metal having a valence from three to five in an inert ethereal liquid.

7. The method as claimed by claim 6 wherein the inert ethereal liquid includes an inert solvent for the borohydride in an amount at least sufficient to solubilize the borohydride.

8. The method as claimed by claim 7 wherein the polyvalent metal is aluminum.

9. The method as claimed by claim 8 wherein the alkali metal borohydride is sodium borohydride.

10. The method as claimed by claim 9 wherein the solvent is selected from the group consisting of the dimethylethers of diethylene glycol and triethylene glycol.

11. The method of preparing an organoboron compound which comprises reacting a 1-olefin with an alkali metal borohydride and a Friedel-Crafts catalyst selected from the group consisting of chlorides, bromides and iodides of a polyvalent metal having a valence from three to five in an inert ethereal liquid.

12. The method as claimed by claim 11 wherein the inert ethereal liquid includes an inert solvent for the borohydride in an amount at least sufficient to solubilize the borohydride.

13. The method as claimed by claim 12 wherein the polyvalent metal is aluminum.

14. The method as claimed by claim 13 wherein the alkali metal borohydride is sodium borohydride.

15. The method as claimed by claim 14 wherein the solvent is selected from the group consisting of the dimethylethers of diethylene glycol and triethylene glycol.

16. The method of preparing an organoboron compound which comprises reacting a 2-olefin with an alkali metal borohydride and a Fridel-Crafts catalyst selected from the group consisting of chlorides, bromides, and iodides of a polyvalent metal having a valence from three to five in an inert ethereal liquid.

17. The method as claimed by claim 16 wherein the inert ethereal liquid includes an inert solvent for the borohydride in an amount at least sufficient to solubilize the borohydride.

18. The method as claimed by claim 17 wherein the polyvalent metal is aluminum.

19. The method as claimed by claim 18 wherein the alkali metal borohydride is sodium borohydride.

20. The method as claimed by claim 19 wherein the solvent is selected from the group consisting of the dimethylethers of diethylene glycol and triethylene glycol.

21. The method of preparing an organoboron compound which comprises reacting a lower cycloolefin with an alkali metal borohydride and a Fridel-Crafts catalyst selected from the group consisting of chlorides, bromides and iodides of a polyvalent metal having a valence from three to five in an inert ethereal liquid.

22. The method as claimed by claim 21 wherein the inert ethereal liquid includes an inert solvent for the borohydride in an amount at least sufficient to solubilize the borohydride.

23. The method as claimed by claim 22 wherein the polyvalent metal is aluminum.

24. The method as claimed by claim 23 wherein the alkali metal borohydride is sodium borohydride.

25. The method as claimed by claim 24 wherein the solvent is selected from the group consisting of the dimethylethers of diethylene glycol and triethylene glycol.

No references cited.